United States Patent
Samson et al.

(10) Patent No.: US 6,871,119 B2
(45) Date of Patent: Mar. 22, 2005

(54) FILTER BASED THROTTLING

(75) Inventors: Eric C. Samson, Folsom, CA (US);
Aditya Navale, El Dorado Hills, CA (US); David M. Puffer, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/421,204

(22) Filed: Apr. 22, 2003

(65) Prior Publication Data

US 2004/0215371 A1 Oct. 28, 2004

(51) Int. Cl.[7] .................. G05D 23/00; G06F 12/00; G06F 13/00; G11C 11/34; G11C 7/04
(52) U.S. Cl. .................. 700/299; 365/212; 711/100
(58) Field of Search .................. 700/299; 365/211, 365/212; 711/100, 154; 702/132

(56) References Cited

U.S. PATENT DOCUMENTS

| | | | |
|---|---|---|---|
| 5,249,141 A | * | 9/1993 | Vandebroek et al. ........ 702/132 |
| 5,953,685 A | | 9/1999 | Bogin et al. |
| 6,141,283 A | | 10/2000 | Bogin et al. |
| 6,173,217 B1 | | 1/2001 | Bogin et al. |
| 6,373,768 B2 | * | 4/2002 | Woo et al. .................. 365/211 |
| 6,470,238 B1 | | 10/2002 | Nizar et al. |
| 6,662,278 B1 | * | 12/2003 | Kahn et al. .................. 711/154 |
| 6,701,272 B2 | * | 3/2004 | Cooper et al. .............. 702/132 |
| 2003/0210247 A1 | * | 11/2003 | Cui et al. .................... 345/534 |
| 2004/0071184 A1 | * | 4/2004 | Naveh et al. .................. 374/42 |

OTHER PUBLICATIONS

U.S. Appl. No. 10/404,773 Entitled "Cycle Type Based Throttling" filed Mar. 31, 2003, 26 pages.

* cited by examiner

Primary Examiner—Leo Picard
Assistant Examiner—Ryan A. Jarrett
(74) Attorney, Agent, or Firm—Jeffrey B. Huter (57) ABSTRACT

Machine-readable media, methods, and apparatus are described to throttle interfaces and/or logic based upon a temperature estimate. Some embodiments may provide thermal effects associated with throttled and non-throttled interfaces to a filter. The filter may update a temperature estimate based upon the provided thermal effects and one or more thermal time constants. Control logic may determine whether to throttle one or more interface based upon the temperature estimate of the filter.

40 Claims, 6 Drawing Sheets

FILTER BASED THROTTLING

BACKGROUND

Thermal specifications of computer system components may define the maximum temperature at which the component may break down, may slow down, or may fail. The temperature of a component may depend upon usage. For example, the temperature of a memory controller and/or a memory device may depend upon the rate at which the memory controller accesses the memory device. While a memory controller and a memory device may support for example a peak transfer rate of 800 MB/s, the memory controller and memory device in certain environments may be able to support a sustained transfer rate of only 500 MB/s without exceeding their thermal limits. In some computer systems, the memory controller may access the memory devices in bursts up to the peak transfer rate (e.g. 800 MB/s) but may limit or throttle accesses to the memory devices to maintain less than a supported sustained transfer rate (e.g. 500 MB/s) in order to guard against overheating.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques that attempt to satisfy thermal requirements of computer system components. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
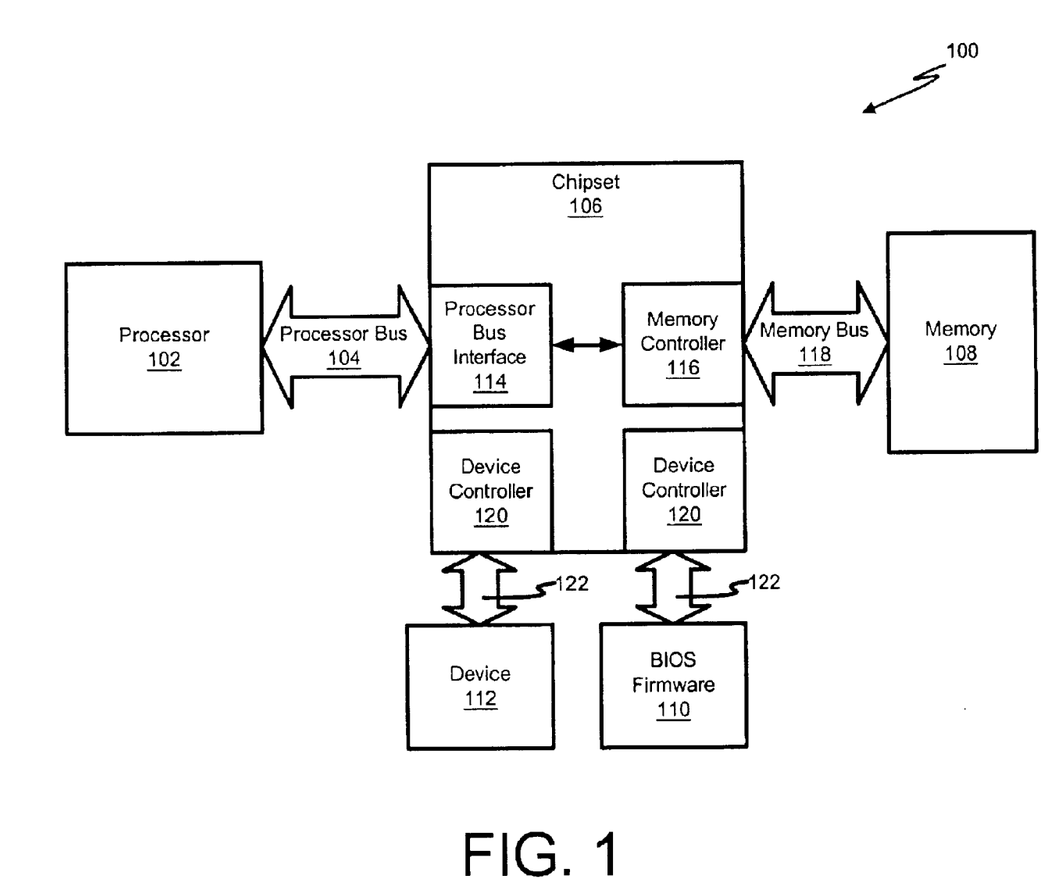
FIG. 1 illustrates an embodiment of a computing device.

An example embodiment of a computing device 100 is shown in FIG. 1. The computing device 100 may comprise one or more processors 102. The processors 102 may perform actions in response to executing instructions. For example, the processors 102 may issue transactions such as memory read transactions and memory write transactions on the processor bus 104.

The computing device 100 may further comprise a chipset 106. The chipset 106 may comprise one or more integrated circuit packages or chips that couple the processors 102 to memory 108, Basic Input/Output System (BIOS) firmware 110 and other devices 112 (e.g. a mouse, keyboard, video display, hard disk, floppy disk, etc.). The chipset 106 may comprise a processor bus interface 114 to receive transactions from the processors 102 and issue transactions to the processors 102 via the processor bus 104. The chipset 106 may further comprise a memory controller 116 to issue read and write transactions to the memory 108 via a memory bus 118. The chipset 106 may further comprise one or more device controllers 120 to access the other devices 112 via buses 122 such as, for example, peripheral component interconnect (PCI) buses, accelerated graphics port (AGP) buses, universal serial bus (USB) buses, low pin count (LPC) buses, and/or other I/O buses.

In one embodiment, the BIOS firmware 110 may comprise routines which the computing device 100 executes during system startup in order to initialize the processors 102, chipset 106, and other components of the computing device 100. Moreover, the BIOS firmware 110 may comprise routines or drivers which the computing device 100 may execute to communicate with one or more components of the computing device 100.

The memory 108 may comprise memory devices having addressable storage locations that the memory controller 116 may read data from and/or write data to. The memory 108 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices.

Moreover, the memory 108 may be arranged in a hierarchal manner. For example, the memory 108 may be arranged in channels, ranks, banks, pages, and columns. In particular, each channel may comprise one or more ranks, each rank may comprise one or more banks, and each bank may comprise one or more pages. Further, each page may comprise one or more columns. When accessing memory, the memory controller 116 may open a page of the memory 108 and then may access one or more columns of the opened page. For a page-hit access, the memory controller 116 may leave a page open after accessing a column of the page for a previous memory request and may access a different column of the open page. For a page-miss access, the memory controller 116 may close an open page of a bank, may open another page of the same bank, and may access a column of the newly opened page. A page-miss access generally consumes more power and therefore has a greater thermal effect than a page-hit access. For a page-empty access, the memory controller may open a closed page of a bank, and may access a column of the newly opened page for the memory transaction. A page-empty access generally consumes more power than a page-hit access but less power than a page-miss access. Accordingly, a page-empty generally has a greater thermal effect than a page-hit access but a lesser thermal effect than a page-miss access.

Figure 2:
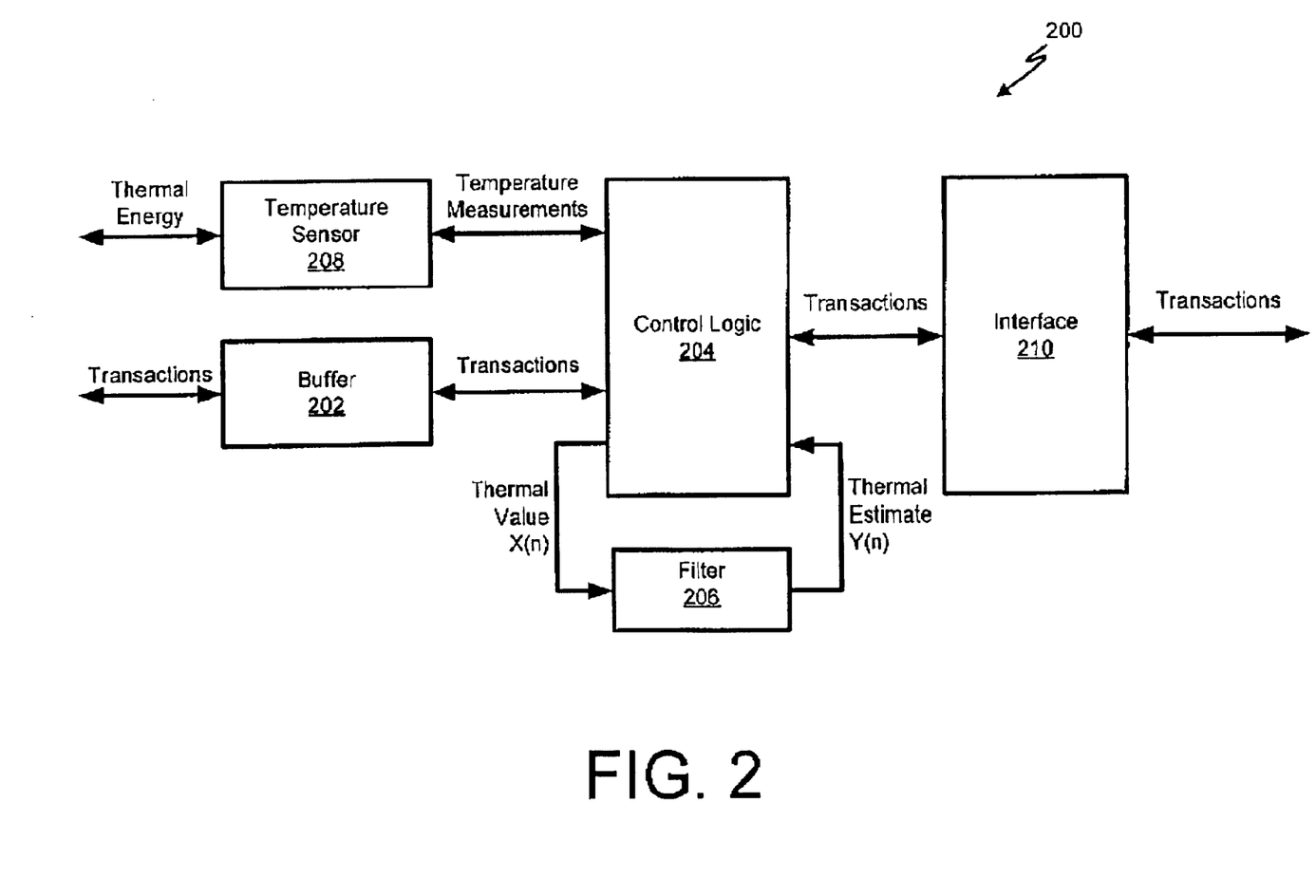
FIG. 2 illustrates an embodiment of a controller of the computing device of FIG. 1.

Referring now to FIG. 2, an embodiment of a controller 200 to throttle servicing of transactions is shown. The controller 200 may comprise the memory controller 116 and/or other device controllers 120 such as, for example PCI Express controller, integrated graphics controllers, Advanced Graphics Port controllers, etc. As illustrated the controller 200 may comprise a buffer 202, control logic 204, a filter 206, a temperature sensor 208 and one or more interfaces 210. The buffer 202 may store one or more pending transactions to be serviced by the controller 200. For example, the buffer 202 may store information such as transaction type, transaction source, transaction destination, data, etc for each of the pending transactions.

The one or more interfaces 210 may service transactions of the buffer 202 by transmitting and/or receiving one or more signals with one or more devices 108, 112 associated with the interfaces 210. The signals generated and received by the interfaces 210 and the associated devices 108, 112 consume power that affect the temperature of the interfaces 210 and the devices 112, 108. Moreover, the signals generated and received by the interfaces 210 and devices 108, 112 depend upon the transactions being serviced. Accordingly, the temperature of the controller 200, interfaces 210 and devices 108, 112 depend upon the transactions serviced. For example, a read page hit to memory 108 may consume less power than a read page miss and thus may have a lower thermal effect. Moreover, a 32 byte transaction may consume less power than a 64 byte transaction and thus may have a lower thermal effect. Further, low speed transactions may consume less power than high speed transactions and thus may have lower thermal effects.

The temperature sensor 208 may sense thermal energy associated with one or more controllers 200, one or more interfaces 210, and/or one or more devices 108, 112 and may generate a temperature measurement $M_n$ that is representative of the sensed thermal energy. Similarly, the filter 206 may generate a temperature estimate or temperature delta estimate $Y_n$ for one or more controllers 200, interfaces 210, and/or devices 108, 112 based upon thermal effects $X_n$ associated with serviced transactions and idle periods. As indicated above, thermal effects $X_n$ may vary based upon transaction type (e.g. memory read, memory write), idle period types (e.g. low power state, normal state), and transaction length (e.g. 32 byte, 64 byte).

Appropriate values for the thermal effects $X_n$ may be determined or obtained for the serviced transactions and idle periods using various techniques. For example, the thermal effects $X_n$ for each transaction type, idle period type, transaction length, etc. may be determined from lab tests without undue experimentation. The thermal effects $X_n$ may also be determined based upon temperature measurements $M_n$ generated by the temperature sensor 208. For example, the temperature sensor 208 may generate a temperature measurement $M_n$ based upon sensed thermal energy of one or more controllers 200, one or more interfaces 210, and/or one or more devices 108, 112 affected by the transaction and/or idle period. The control logic 204 and/or the filter 206 may use the generated temperature measurement $M_n$ as the thermal effect $X_n$ for the serviced transaction and/or idle period. In another embodiment, the control logic 204 and/or the filter 206 may determine the thermal effect $X_n$ for the serviced transaction and/or idle period based upon the temperature measurement $M_n$.

In one embodiment, the filter 206 may generate the temperature estimate $Y_n$ based upon a first order recursive filter described by the following equation:

$$Y_n = \alpha(-Y_{n-1} + X_n) + Y_{-1}$$

where thermal weight a corresponds to the period T of the current transaction n divided by the thermal time constant $\tau$, $Y_n$ corresponds to the temperature estimate of the current transaction n, $Y_{n-1}$ corresponds to the temperature estimate after the previous transaction n−1, and $X_n$ corresponds to the thermal effect for the current transaction n.

In other embodiments, the filter 206 may generate the temperature estimate $Y_n$ in accordance to other types and/or implementations of filters. For example, the filter 206 may comprise auto regressive moving average filters such as, for example, infinite impulse response filters, may comprise moving average filters such as, for example, finite impulse response filters to name a few. Further, the filter 206 may account for one or more thermal time constants $\tau_1, \tau_2 \ldots \tau_m$ of the system being monitored. For example, the filter 206 may generate the temperature estimate $Y_n$ based upon a first order recursive filter described by the following equation:

$$Y_n = \sum_{j=1}^{m} \alpha_j(-Y_{n-1} + X_{n,j}) + Y_{n-1}$$

in which thermal weights $\alpha_1, \alpha_2 \ldots \alpha_m$ account for thermal time constants $\tau_1, \tau_2 \ldots \tau_m$ of system components $D_1, D_2 \ldots D_m$ and $X_{n,1} X_{n,2} \ldots X_{n,m}$ correspond to the thermal effect $X_n$ associated with the system components $D_1, D_2 \ldots D_m$ respectively.

In one embodiment, the thermal weights $\alpha_1, \alpha_2 \ldots \alpha_m$ loosely approximates the correspond transaction period T and thermal time constants $\tau_1, \tau_2 \ldots \tau_m$. In particular, one embodiment constrains the thermal weights $\alpha_1, \alpha_2 \ldots \alpha_m$ to a power of two (e.g. $2^{-18}, 2^{-19}$, etc). Limiting the thermal weights $\alpha_1, \alpha_2 \ldots \alpha_m$ to powers of two may reduce the complexity of hardware implementations of the filter 206 that utilize digital logic. Further, in one embodiment, the control logic 204 may dynamically update the thermal weights $\alpha_1, \alpha_2 \ldots \alpha_m$. For example, the control logic 204 may adjust the thermal weights $\alpha_1, \alpha_2 \ldots \alpha_m$ during system shutdown to ensure that the temperature of devices is below a threshold level before powering down cooling units such as, for example, fans.

The control logic 204 may control how the interface 210 services transactions of the buffer 202 based upon temperature measurements $M_n$ and/or temperature estimates $Y_n$ for the controller 200, interface 210, and/or devices 108, 112. In particular, the control logic 204 may determine to throttle the interface 210 based upon a temperature estimate $Y_n$ generated by the filter 206 having a predetermined relationship to (e.g. greater than) a throttling threshold T. The control logic 204 may also determine to stop throttling the interface 210 in response to the temperature estimate $Y_n$ having a predetermined relationship (e.g. less than) a resume threshold R.

In one embodiment, the control logic 204 may utilize a single threshold $T_R$ in which the control logic 204 may determine to throttle the interface 210 in response to the temperature estimate $Y_n$ being greater than the threshold $T_R$ and to stop throttling the interface 210 in response to the temperature estimate $Y_n$ being less than the threshold $T_R$. However, it should be appreciated that using a separate resume threshold R that is less than the throttle threshold T may result in more efficient use of available bandwidth. Such efficiencies may result from the controller 200 being able to generate longer bursts of transactions that are efficiently processed by the interface 210 and the target device 108, 112. Further, the controller 200 may be able to better schedule transactions as a result of having more transactions from which to select and/or as a result of having more time to schedule transactions that are pending in the buffer 202.

During non-throttling periods, the control logic 204 may cause the interface 210 to service transactions of the buffer 202 in a manner that attempts to maximize the throughput of interface 210. However during throttling periods, the control logic 204 may cause the interface 210 to service transactions of the buffer 202 in a manner that attempts to reduce power consumption and therefore the temperature of the controller 200, interface 210, and/or associated devices 108, 112 at the cost of throughput.

As indicated above, the power consumed by the controller 200, interface 210, and/or associated devices 108, 112 depends upon the transactions serviced. Accordingly, the control logic 204 may throttle the interface 210 using one or more different techniques. In one embodiment, the control logic 200 may idle the interface 210 during throttling periods in order to reduce the temperature of the controller 200, interface 210, and/or devices 108, 112. As a result of idling the interface 210, the interface 210 may quiesce signals associated with servicing transactions thus reducing power consumption of the controller 200, interface 210, and/or devices 108, 112. In addition to quiescing signals of the interface 210, the control logic 200 may power down portions of the interface 210 during the throttling state.

In another embodiment, the control logic 204 may throttle the interface 210 by reducing the operating frequency of the interface 210 and therefore reducing the frequency of signals associated with the transaction. While the reduced operating frequency may reduce the transfer rate and throughput of the interface 210, the reduced operating frequency may also reduce the power consumed by the controller 200, interface 210, and/or device 108, 112 thus reducing their respective temperatures.

In yet another embodiment, the control logic 204 may throttle the interface 210 by causing the interface 210 to service transactions of the buffer 202 that satisfy predetermined thermal criteria. As stated above, some transactions consume more power than others. Accordingly, the control logic 204 may prevent the interface 210 from servicing transactions that have a thermal effect $X_n$ with a first relationship (e.g. greater than) to a defined limit L, and may permit the interface 210 to service transactions that have a thermal effect $X_n$ with a second relationship (e.g. not greater than) to the defined limit L. For example, the interface 210 may service memory page hit transactions and memory page empty transactions, but may forgo servicing of memory page miss transactions when throttled by the control logic 204. Transaction ordering rules, however, may prevent the interface 210 from servicing transactions under such a throttling scheme even though the buffer 202 contains pending transactions that satisfy the above thermal criteria.

In one embodiment, the BIOS firmware 110 or some other mechanism of the computing device 100 such as, for example, an operating system may provide interfaces and routines for defining the thermal effects for various transaction types, transaction lengths, and idle period types. Moreover, the BIOS firmware 110 may provide interfaces and routines for defining the throttle threshold T, the resume threshold R, the single threshold $T_R$, thermal constants (e.g. thermal weights $\alpha_1, \alpha_2 \ldots \alpha_m$, thermal time constants $\tau_1, \tau_2 \ldots \tau_m$) and other parameters used to throttle the interface 210. Due to its programmability, the same or similar circuitry may be incorporated into a variety of different platforms and/or controllers 200 (e.g. PCI, USB, PCI-Express, etc.) to provide adequate thermal throttling for such platforms and/or controllers.

Figure 3:
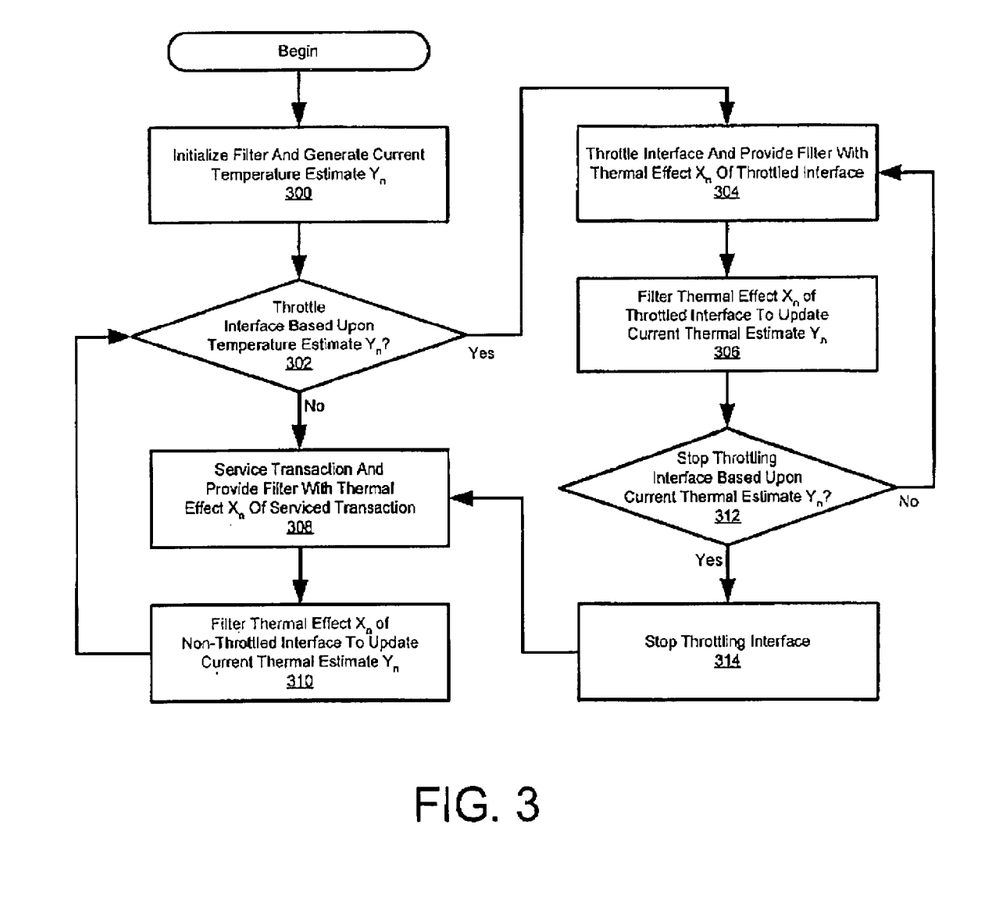
FIG. 3 illustrates an embodiment of a throttling method of the controller of FIG. 2.

Referring now to FIG. 3, an embodiment of a throttling method is depicted. In block 300, the control logic 204 may initialize the filter 206 and may cause the filter 206 to generate an initial temperature estimate $Y_n$. In one embodiment, the control logic 204 may clear a previous temperature estimate $Y_{n-1}$, may set the thermal weight a to an appropriate value, and may provide the filter 206 with the thermal effect $X_n$ corresponding to an idle interface 210. The filter 206 may then generate the current temperature estimate $Y_n$ based upon the previous temperature estimate $Y_{n-1}$ and the thermal weight a in the manner described above.

In block 302, the control logic 204 may determine whether to throttle the interface 210 based upon the current temperature estimate $Y_n$. In one embodiment, the control logic 204 may determine to throttle the interface 210 in response to the current temperature estimate $Y_n$ having a first relationship to (e.g. greater than) a throttle threshold T, and may determine not to throttle the interface 210 in response to the current temperature estimate $Y_n$ having a second relationship to (e.g. not greater than) the throttle threshold T.

In response to determining to throttle the interface 210, the control logic 204 may throttle the interface 210 and may provide the filter 206 with the thermal effect $X_n$ associated with throttling the interface 210 for the transaction period n in block 304. As indicated previously, the control logic 204 may throttle the interface 210 for one transaction period n using one or more different techniques such as, for example, idling the interface for one transaction period n and/or limiting the interface 210 to servicing a transaction having a thermal effect that satisfies predetermined thermal criteria. In block 306, the filter 206 may update the current temperature estimate $Y_n$ based upon the received thermal effect $X_n$. For example, in response to idling the interface 210, the filter 206 may update the current temperature estimate $Y_n$ based upon a thermal effect $X_n$ for an idle period.

In response to not throttling the interface 210, the control logic 204 in block 308 may cause the interface 210 to service a pending transaction of the buffer 202 and may provide the filter 206 with a thermal effect $X_n$ for the serviced transaction. If the buffer 202 has no pending transactions, then the control logic 204 may idle the interface 210 for one transaction period n and may provide the filter 206 with a thermal effect $X_n$ of idling the interface 210. In block 310, the filter 206 may update the current temperature estimate $Y_n$ based upon the received thermal effect $X_n$. For example, in response to a memory read page miss transaction, the filter 206 may update the current temperature estimate $Y_n$ based upon a thermal effect $X_n$ for a memory read page miss transaction.

In block 312, the control logic 204 may determine whether to stop throttling the interface 210 based upon the current temperature estimate $Y_n$. In one embodiment, the control logic 204 may determine to stop throttling the interface 210 in response to the current temperature estimate $Y_n$ having a first relationship to (e.g. less than) a resume threshold R, and may determine to continue throttling the interface 210 in response to the current temperature estimate $Y_n$ having a second relationship to (e.g. not less than) the resume threshold R.

In response to determining to stop throttling the interface 210, the control logic 204 in block 314 may stop throttling the interface 210 and may return to block 308 in order to select another transaction for the non-throttled interface 210 to service. Otherwise, the control logic 204 may return to block 304 in order to continue throttling of the interface 210.

Figure 4:
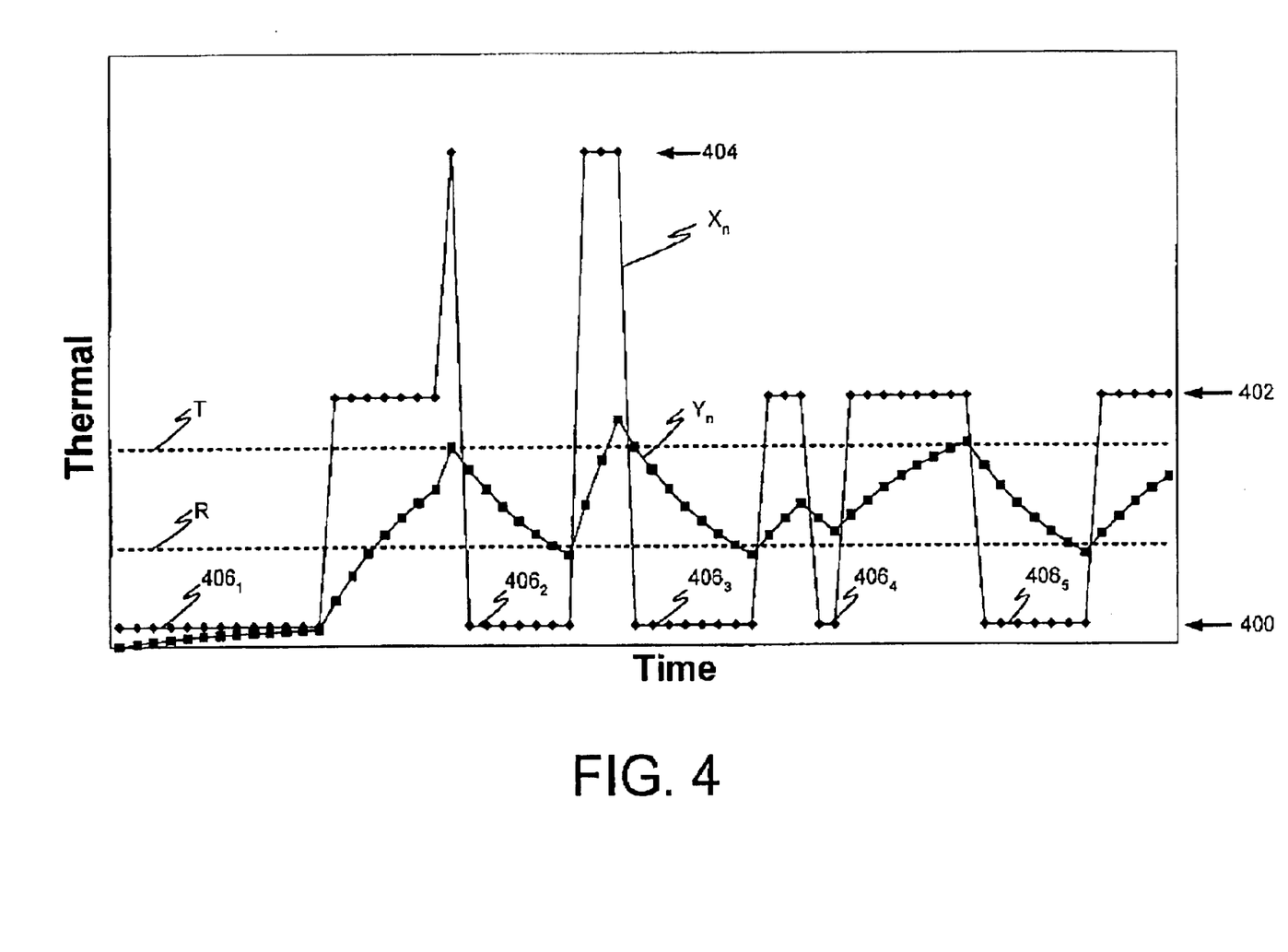
FIG. 4 comprises a graph of an application of the throttling method of FIG. 3 to a series of transactions.

A graph is shown in FIG. 4 that depicts an example application of the throttling method of FIG. 3 to a series of transactions. In particular, the graph depicts a current temperature estimate $Y_n$ for each transaction period n, a thermal effect $X_n$ for each transaction period n, a throttle threshold T, and a resume threshold R. As depicted, each transaction period n may have one of three thermal effects $X_n$: an idle period thermal effect 400, a first transaction thermal effect 402, or a second transaction thermal effect 404. However, it should be appreciated that some embodiments may use more levels of thermal effects $X_n$ and that the use of three levels in FIG. 4 is merely illustrative. The graph further illustrates five idle periods $406_1 \ldots 406_5$. However, only the three idle periods $406_2$, $406_3$, and $406_5$ are the result of the control logic 204 throttling the interface 210 as evidenced by the temperature estimate $Y_n$ exceeding the throttle threshold T immediately preceding each idle period $406_2$, $406_3$, and $406_5$.

Figure 5:
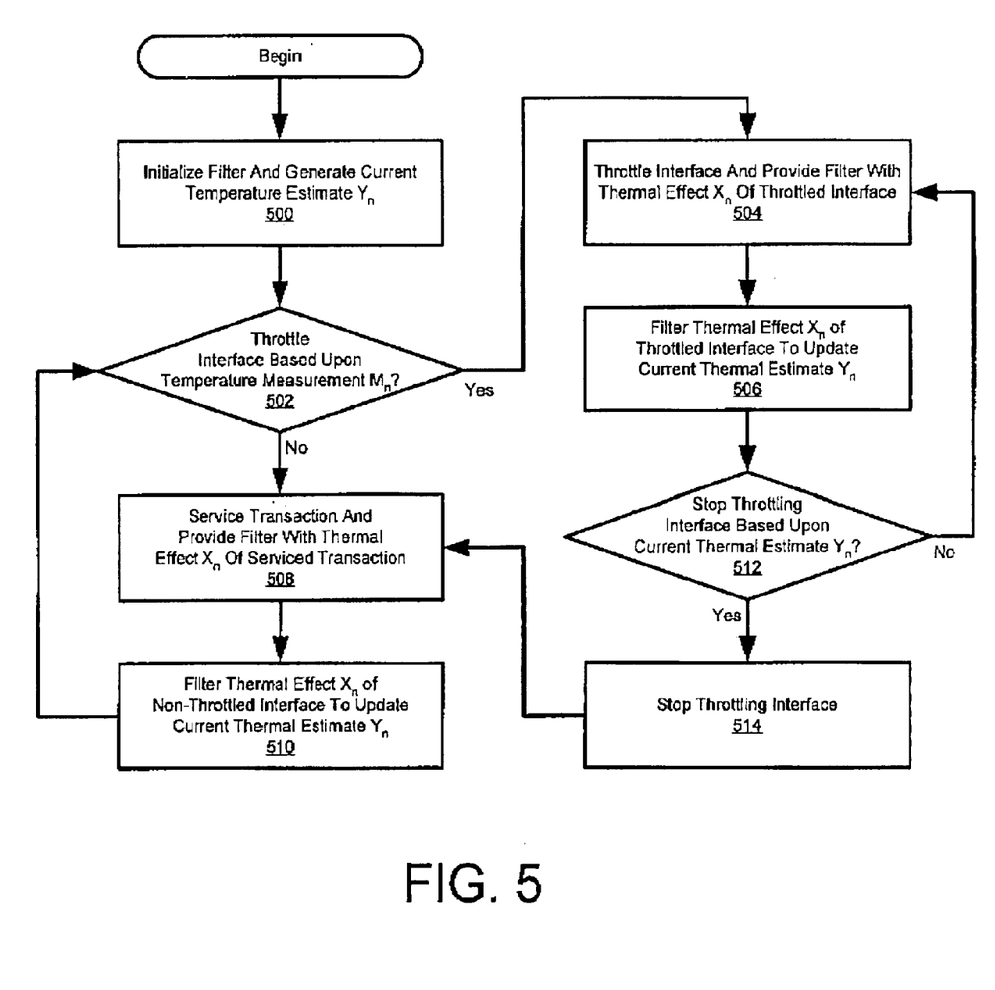
FIG. 5 illustrates another embodiment of a throttling method of the controller of FIG. 2.

Referring now to FIG. 5, another embodiment of a throttling method is depicted. In block 500, the control logic 204 may initialize the filter 206 and may cause the filter 206 to generate an initial temperature estimate $Y_n$. In one embodiment, the control logic 204 may clear a previous temperature estimate $Y_{n-1}$, may set the thermal weight a to an appropriate value, and may provide the filter 206 with the thermal effect $X_n$ corresponding to an idle interface 210. The filter 206 may then generate the current temperature estimate $Y_n$ based upon the previous temperature estimate $Y_{n-1}$ and the thermal weight a in the manner described above.

In block 502, the control logic 204 may determine whether to throttle the interface 210 based upon a temperature measurement $M_n$ of the temperature sensor 208. In one embodiment, the control logic 204 may determine to throttle the interface 210 in response to the temperature measurement $M_n$ having a first relationship to (e.g. greater than) a throttle threshold T, and may determine not to throttle the interface 210 in response to the temperature measurement $M_n$ having a second relationship to (e.g. not greater than) the throttle threshold T.

In response to determining to throttle the interface 210, the control logic 204 may throttle the interface 210 for a transaction period n and may provide the filter 206 with the thermal effect $X_n$ associated with throttling the interface 210 in block 504. As indicated previously, the control logic 204 may throttle the interface 210 for one transaction period n using one or more different techniques such as, for example, idling the interface for one transaction period n and/or limiting the interface 210 to servicing a transaction having a thermal effect $X_n$ that satisfies predetermined thermal criteria. In block 506, the filter 206 may update the current temperature estimate $Y_n$ based upon the received thermal effect $X_n$. For example, in response to idling the interface 210, the filter 206 may update the current temperature estimate $Y_n$ based upon a thermal effect $X_n$ for an idle period.

In response to not throttling the interface 210, the control logic 204 in block 508 may cause the interface 210 to service a pending transaction of the buffer 202 and may provide the filter 206 with a thermal effect $X_n$ for the serviced transaction. If the buffer 202 has no pending transactions, then the control logic 204 may idle the interface 210 for one transaction period n and may provide the filter 206 with a thermal effect $X_n$ of idling the interface 210. In block 510, the filter 206 may update the current temperature estimate $Y_n$ based upon the received thermal effect $X_n$. For example, in response to a PCI Express read transaction, the filter 206 may update the current temperature estimate $Y_n$ based upon a thermal effect $X_n$ for a PCI Express read transaction.

In block 512, the control logic 204 may determine whether to stop throttling the interface 210 based upon the current temperature estimate $Y_n$. In one embodiment, the control logic 204 may determine to stop throttling the interface 210 in response to the current temperature estimate $Y_n$ having a first relationship to (e.g. less than) a resume threshold R, and may determine to continue throttling the interface 210 in response to the current temperature estimate $Y_n$ having a second relationship to (e.g. not less than) the resume threshold R.

In response to determining to stop throttling the interface 210, the control logic 204 in block 514 may stop throttling the interface 210 and may return to block 508 in order to select another transaction for the non-throttled interface 210 to service. Otherwise, the control logic 204 may return to block 504 in order to continue throttling of the interface 210.

Figure 6:
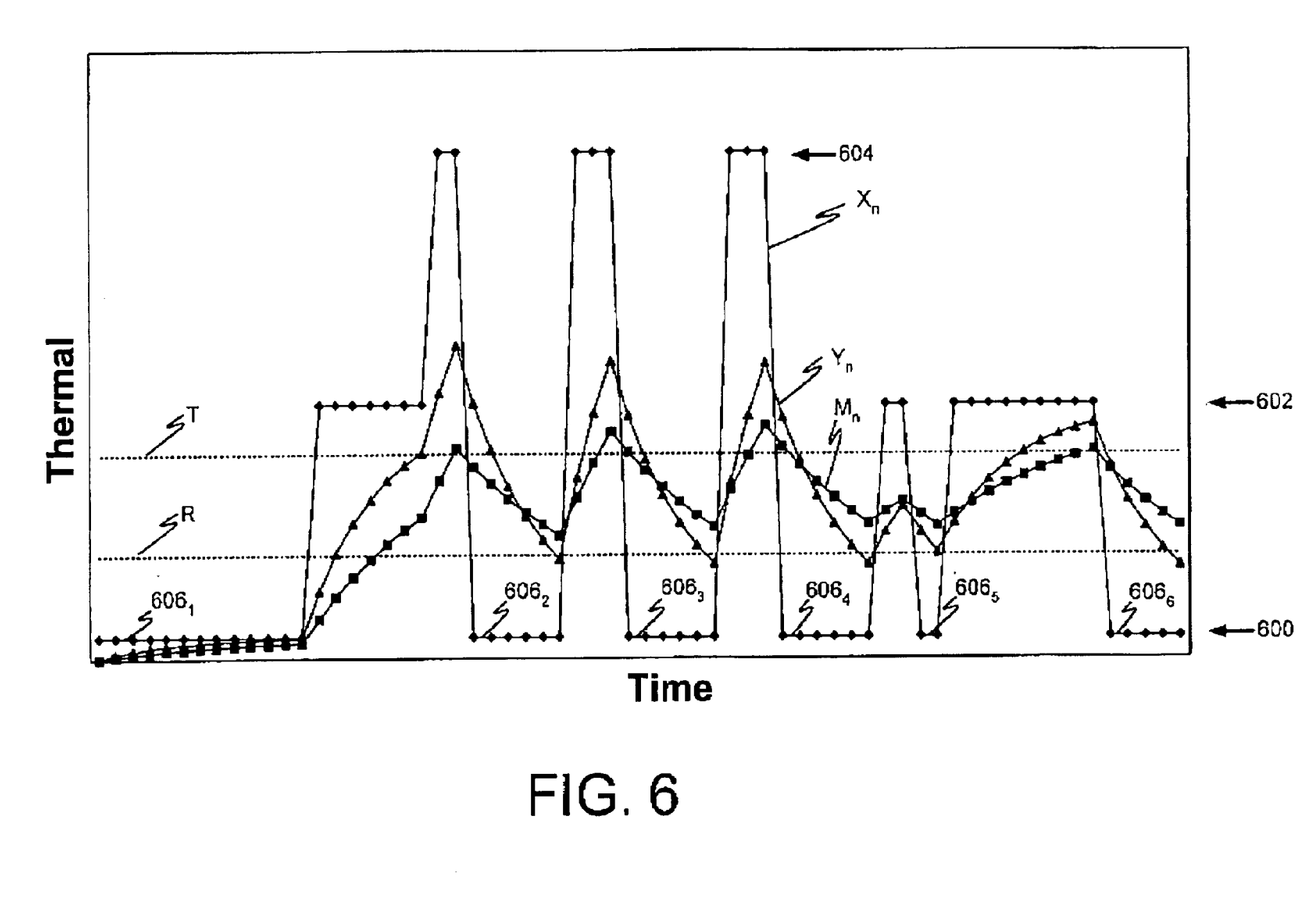
FIG. 6 comprises a graph of an application of the throttling method of FIG. 5 to a series of transactions.

A graph is shown in FIG. 6 that depicts an example application of the throttling method of FIG. 5 to a series of transactions. In particular, the graph depicts a temperature measurement $M_n$, a current temperature estimate $Y_n$ for each transaction period n, a thermal effect $X_n$ for each transaction period n, a throttle threshold T, and a resume threshold R. As depicted, each transaction period n may have one of three thermal effects $X_n$: an idle period thermal effect 600, a first transaction thermal effect 602, or a second transaction thermal effect 604. However, it should be appreciated that some embodiments use more levels of thermal effects $X_n$ and that the use of three levels is merely illustrative. The graph further illustrates six idle periods $606_1 \ldots 606_6$. However, only the four idle periods $606_2$, $606_3$, $606_4$, and $606_6$ are the result of the control logic 204 throttling the interface 210 as evidenced by the temperature measurement $M_n$ exceeding the throttle threshold T immediately preceding each idle period $606_2$, $606_3$, $606_4$ and $606_6$.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
    generating a temperature estimate for a device based upon thermal effects associated with serviced transactions in response to each serviced transaction, and
    throttling service of transactions until the temperature estimate has a predetermined relationship with a resume threshold.

2. The method of claim 1 further comprising invoking the throttling of service in response to a temperature measurement having a redetermined relationship to a throttle threshold that corresponds to a higher temperature than the resume threshold.

3. The method of claim 1 further comprising invoking the throttling of service in response to the temperature estimate having a predetermined relationship to a throttle threshold that corresponds to a higher temperature than the resume threshold.

4. The method of claim 1 wherein generating comprises updating the temperature estimate based upon a thermal consant for the device.

5. The method of claim 1 wherein generating comprises updating the temperature estimate based upon a plurality of thermal constants.

6. The method of claim 1 wherein generating comprises updating the temperature estimate based upon one or more previous temperature estimates.

7. The method of claim 1 wherein generating comprises applying a first order filter to the thermal effects of the serviced transactions.

8. The method of claim 1 further comprising servicing the transactions with a plurality of interfaces, wherein generating comprises
    generating the temperature estimate based upon the thermal effects associated with transactions serviced by the plurality of interfaces.

9. The method of claim 1 further comprising determining an appropriate thermal effect for each serviced transaction.

10. An apparatus comprising
    an interface to service transactions,
    a filter to generate a temperature estimate based upon thermal effects associated with transactions serviced by the interface in response to each transaction serviced by the interface, and
    control logic to control, based upon the temperature estimate, servicing of transactions by the interface.

11. The apparatus of claim 10 wherein the control logic throttles the interface in response to a temperature measurement of the interface having a predetermined relationship to a throttle threshold.

12. The apparatus of claim 11 wherein the control logic stops throttling the interface in response to the temperature estimate having a predetermined relationship to a resume threshold that corresponds to a lower temperature than the throttle threshold.

13. The apparatus of claim 10 wherein the control logic throttles the interface in response to a temperature measurement of a device having a predetermined relationship to a throttle threshold.

14. The apparatus of claim 10 further comprising a second interface to service transactions, wherein
    the filter generates the temperature estimate based further upon thermal effects associated with transactions serviced by the second interface, and
    the control logic controls the second interface based on the temperature estimate.

15. The apparatus of claim 10 wherein the filter generates the temperature estimate based upon a thermal constant for the interface.

16. The apparatus of claim 10 wherein the filter generates the temperature estimate based upon a plurality of thermal constants.

17. The apparatus of claim 10 wherein
    the control logic dynamically updates one or more thermal constants, and
    the filter generates the temperature estimate based upon a plurality of thermal constants.

18. The apparatus of claim 10 wherein the filter generates the temperature estimate based upon one or more previous temperature estimates.

19. The apparatus of claim 10 wherein the filter comprises a first order filter to generate the temperature estimate based upon the thermal effects of the serviced transactions.

20. The apparatus of claim 10 wherein the control logic determines an appropriate thermal effect for each serviced transaction.

21. A system comprising
    volatile memory to retrieve and store data associated with memory transactions, and
    an integrated circuit comprising an interface to the volatile memory, a filter to generate a temperature estimate from thermal effects of serviced memory transactions in response to each serviced memory transaction, and control logic to throttle the interface based upon the temperature estimate.

22. The system of claim 21 further comprising a thermal sensor to generate a temperature measurement, wherein the control logic throttles the interface in response to the temperature measurement having a predetermined relationship to a throttle threshold.

23. The system of claim 21 wherein the control logic throttles the interface in response to the temperature estimate having a predetermined relationship to a throttle threshold.

24. The system of claim 21 wherein the filter updates the temperature estimate based upon a thermal constant of a memory controller.

25. The system of claim 21 wherein the filter updates the temperature estimate based upon a thermal constant of the volatile memory.

26. The system of claim 21 wherein the filter updates the temperature estimate based upon a plurality of thermal constants.

27. The system of claim 21 further comprising a device, wherein
    the integrated circuit further comprises a second interface to the device,
    the filter further updates the temperature estimate based upon the thermal effects of transactions serviced by the second interface, and
    the control logic further throttles the second interface based upon the temperature estimate.

28. A machine-readable medium comprising a plurality of instructions that in response to being executed result in a computing device
    generating a temperature estimate based upon thermal effects associated with serviced transactions and thermal effects associated with idle transaction periods in response to each serviced transaction and in response to each transaction period that is idle, and
    throttling service of transactions based upon the temperature estimate.

29. The machine-readable medium of claim 28 wherein the plurality of instructions further result in the computing device
- throttling service of transaction in response to the temperature estimate having a first relationship to a throttle threshold, and
- throttling service of transactions until the temperature estimate has a predetermined relationship to a resume threshold that corresponds to a lower temperature than the throttle threshold.

30. The machine-readable medium of claim 28 wherein the plurality of instructions further result in the computing device
- throttling service of transactions in response to a temperature measurement having a first relationship to a throttle threshold, and
- throttling service of transactions until the temperature estimate has a predetermined relationship to a resume threshold that corresponds to a lower temperature than the throttle threshold.

31. The machine-readable medium of claim 28 wherein the plurality of instructions further result in the computing device updating the temperature estimate based upon a thermal constant for the device.

32. The machine-readable medium of claim 28 wherein the plurality of instructions further result in the computing device updating the temperature estimate based upon a plurality of thermal constants.

33. The machine-readable medium of claim 28 wherein the plurality of instructions further result in the computing device updating the temperature estimate based upon one or more previous temperature estimates.

34. The machine-readable medium of claim 28 wherein the plurality of instructions further result in the computing device updating one or more thermal constants used to estimate the temperature.

35. The method of claim 1 wherein generating comprises updating the temperature estimate based upon thermal effects associated with idle transaction periods in response to each transaction period that is idle.

36. The method of claim 1 wherein generating comprises updating the temperature estimate based upon a first thermal effect associated with a page-miss transaction, a second thermal effect associated with a page-hit transaction, or a third thermal effect associated with a page-empty transaction depending upon whether a serviced transaction is a page-miss transaction, a page-hit transaction, or a page-empty transaction.

37. The method of claim 1 wherein throttling comprises servicing only transactions that have a thermal effect with a particular relationship to a limit.

38. The apparatus of claim 10 wherein the filter updates the temperature estimate based upon thermal effects associated with idle transaction periods in response to each transaction period that is idle.

39. The apparatus of claim 10 wherein the filter updates the temperature estimate based upon a first thermal effect associated with a page-miss transaction, a second thermal effect associated with a page-hit transaction, or a third thermal effect associated with a page-empty transaction depending upon whether a serviced transaction is a page-miss transaction, a page-hit transaction, or a page-empty transaction.

40. The apparatus of claim 10 wherein throttling comprises preventing servicing of transactions that have a thermal effect with a particular relationship to a limit.

* * * * *

UNITED STATES PATENT AND TRADEMARK OFFICE
CERTIFICATE OF CORRECTION

PATENT NO. : 6,871,119 B2
DATED : March 22, 2005
INVENTOR(S) : Samson et al.

It is certified that error appears in the above-identified patent and that said Letters Patent is hereby corrected as shown below:

Column 4,
Line 32, delete "a" and insert -- $\alpha$ --.

Column 6,
Line 35, delete "a" and insert -- $\alpha$ --.

Column 7,
Lines 52 and 57, delete "a" and insert -- $\alpha$ --.

Column 9,
Line 14, delete "redetermined" and insert -- predetermined --.

Signed and Sealed this

Twenty-eighth Day of June, 2005

JON W. DUDAS
*Director of the United States Patent and Trademark Office*